United States Patent
Pan (10) Patent No.: US 8,639,197 B2
(45) Date of Patent: Jan. 28, 2014

(54) METHOD AND SYSTEM TO PREVENT HARMONICS FROM CAUSING DISTORTION IN A COMMUNICATIONS SYSTEM

(75) Inventor: Meng-An Pan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1219 days.

(21) Appl. No.: 12/079,389

(22) Filed: Mar. 25, 2008

(65) Prior Publication Data

US 2009/0247095 A1 Oct. 1, 2009

(51) Int. Cl.
*H04B 1/04* (2006.01)
*H04B 17/00* (2006.01)

(52) U.S. Cl.
USPC .................. 455/114.3; 455/114.2; 455/115.1; 455/115.2; 375/297

(58) Field of Classification Search
USPC .......... 455/114.3, 43, 115.1, 226.1, 311, 208, 455/76, 78, 131, 113, 326, 73, 118, 127.2, 455/69, 313, 318, 114.2, 67.13, 295–296; 375/297, 284, 285, 296, 254, 278
See application file for complete search history.

(56) References Cited

U.S. PATENT DOCUMENTS

| | | | | |
|---|---|---|---|---|
| 6,570,394 B1 * | 5/2003 | Williams | | 324/620 |
| 6,694,129 B2 * | 2/2004 | Peterzell et al. | | 455/76 |
| 7,142,615 B2 * | 11/2006 | Hongo et al. | | 375/297 |
| 7,242,725 B2 * | 7/2007 | Matsumoto et al. | | 375/285 |
| 7,400,129 B1 * | 7/2008 | Prather | | 324/76.19 |
| 7,634,238 B2 * | 12/2009 | Suzuki et al. | | 455/114.3 |
| 7,711,327 B2 * | 5/2010 | Sowlati et al. | | 455/73 |
| 7,907,678 B2 * | 3/2011 | Mizuta et al. | | 375/297 |
| 8,019,015 B2 * | 9/2011 | Moffatt et al. | | 375/297 |
| 8,126,036 B2 * | 2/2012 | Koren et al. | | 375/219 |
| 2004/0196921 A1 * | 10/2004 | Matsumoto et al. | | 375/285 |
| 2009/0075612 A1 * | 3/2009 | Keehr et al. | | 455/226.1 |
| 2010/0309774 A1 * | 12/2010 | Astrom | | 370/201 |
| 2010/0316172 A1 * | 12/2010 | Keehr et al. | | 375/344 |

* cited by examiner

*Primary Examiner* — Pablo Tran
(74) *Attorney, Agent, or Firm* — Farjami & Farjami LLP

(57) ABSTRACT

According to one exemplary embodiment, a method of preventing harmonics from causing distortion in a communications system includes feeding a test signal through a pre-distortion circuit in the communications system to a transmitter in the communications system. The method continues by transmitting a distorted output signal produced by the transmitter to an analyzer, analyzing the distorted output signal to identify one or more undesired harmonics, and generating and sending calibration data from the analyzer to calibrate the pre-distortion circuit, thereby preventing the one or more undesired harmonics from causing distortion in the communications system. In one embodiment, a system to prevent harmonics from causing distortion in a communications system includes a pre-distortion circuit, a transmitter, and an analyzer configured to identify one or more undesired harmonics and to generate and send calibration data to prevent the undesired harmonics from causing distortion.

20 Claims, 8 Drawing Sheets

METHOD AND SYSTEM TO PREVENT HARMONICS FROM CAUSING DISTORTION IN A COMMUNICATIONS SYSTEM

BACKGROUND OF THE INVENTION

1. Field of the Invention

The present invention is generally in the field of electronic circuits and systems. More specifically, the present invention is in the field of communications circuits and systems.

2. Background Art

Transmitters are typically used in communications systems, such as transceivers, to provide up-conversion and amplification of an input baseband signal, for transmission at radio frequency (RF), for example. In a conventional RF transmitter, a mixer may be utilized in combination with a power amplifier driver or pre-amp driver (PAD) and a power amplifier (PA) to impart a desirable transmission power level to the up-converted output signal. In an ideal transmitter displaying linear performance, the amplification of the input signal produced by the transmitter, i.e. the gain, is constant, and does not depend on the strength of the input signal. In real world operational conditions, however, it is well known that transmitter performance may become undesirably non-linear, producing distortion in the output signal when, for example, the strength of the input signal exceeds a threshold level characteristic of the transmitter.

A conventional approach to correcting the non-linearity of a real transmitter requires a complicated and time consuming process for analytically modeling the distortion of the output signal. That distortion modeling is typically followed by the similarly complex formulation of a transfer function simulating the inverse of the distortion imposed by the transmitter, in order to provide a pre-distortion algorithm designed to compensate for the non-linear performance. The dual disadvantages of technical complexity and consumption of time, however, make this conventional approach an expensive and undesirable solution to the problem of transmitter distortion.

Thus, conventional techniques for correcting distortion produced by a transmitter require costly time and resource expenditures for their implementation. Consequently, there is a need in the art for an efficient and comparatively inexpensive solution providing substantial correction for the distortion of an output signal produced by a transmitter utilized in a communications system.

SUMMARY OF THE INVENTION

Method and system to prevent harmonics from causing distortion in a communications system, substantially as shown in and/or described in connection with at least one of the figures, and as set forth more completely in the claims.

DETAILED DESCRIPTION OF THE INVENTION

The present invention is directed to method and system to prevent harmonics from causing distortion in a communications system. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1A:
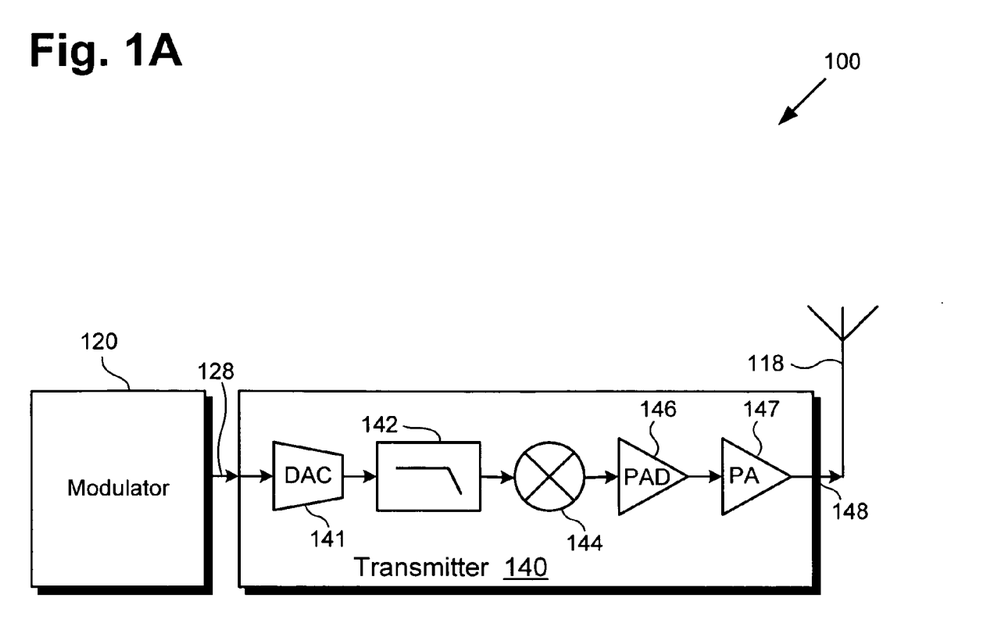
FIG. 1A is a block diagram showing a conventional system including a transmitter which may display non-linear performance.

FIG. 1A is a block diagram showing a conventional system including a transmitter which may display non-linear performance. FIG. 1A shows communications system 100 comprising modulator 120, antenna 118, and transmitter 140 receiving input signal 128 and producing output signal 148. Also shown in FIG. 1A are transmitter components: digital-to-analog converter (DAC) 141, low-pass filter 142, mixer 144, power amplifier driver or pre-amp driver (PAD) 146, and power amplifier (PA) 147. Communications system 100 may be utilized in a mobile telephone, or Bluetooth enabled device, communicating at radio frequency (RF), for example.

During normal operation of communications system 100, modulator 120, which in the present embodiment is a digital signal modulator, provides a baseband signal as input signal 128 to transmitter 140. Up-conversion and amplification of input signal 128 is performed by the components of transmitter 140. DAC 141 converts input signal 128 from a digital signal to an analog signal at baseband. Low-pass filter 142 is utilized to remove spurious high frequency components produced during initial signal processing. Mixer 144 working in combination with a transmitter local oscillator (not shown in FIG. 1A) is used to up-convert input signal 128 from baseband to a desired transmission frequency. The up-converted signal is then amplified using PAD 146 and PA 147, and provided as output signal 148 to antenna 118 for transmission.

Figure 1B:
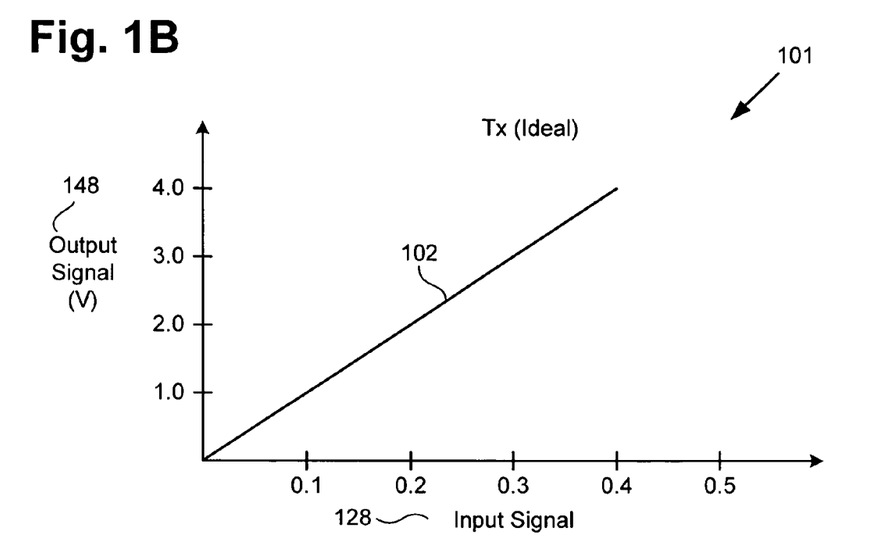
FIG. 1B is a graph showing output amplitude of a communications signal as a function of input amplitude, for an ideal transmitter displaying linear performance.
Figure 1C:
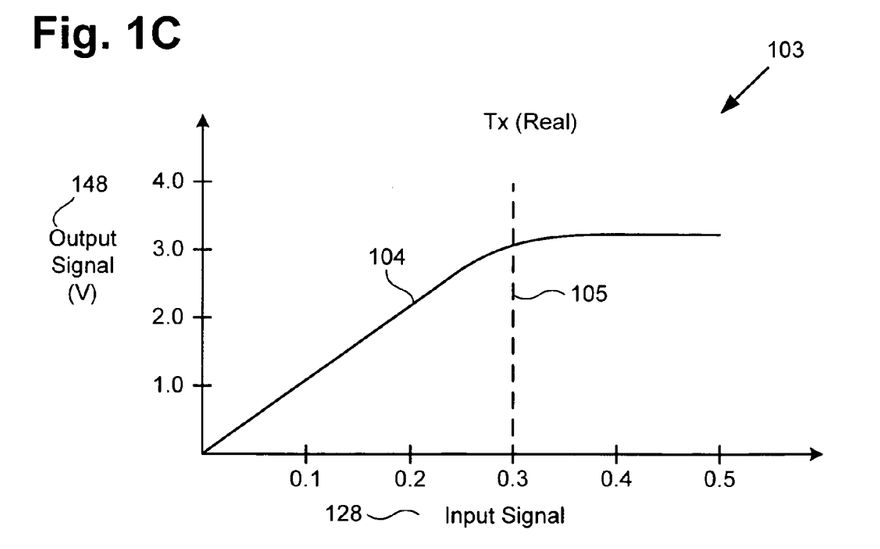
FIG. 1C is a graph showing output amplitude of a communications signal as a function of input amplitude, for a real transmitter displaying non-linear performance.
Figure 1D:
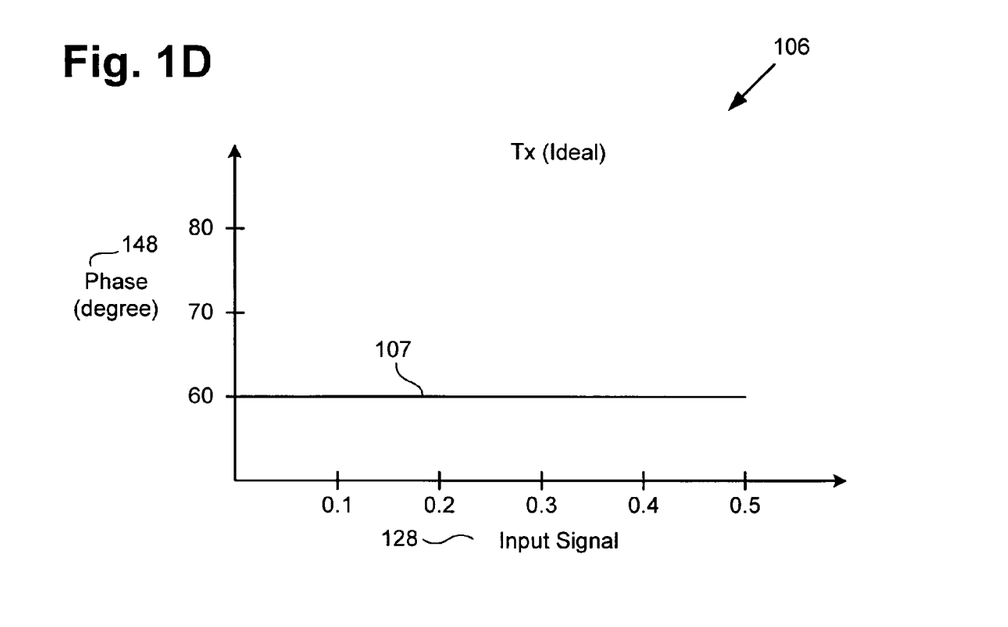
FIG. 1D is a graph showing a constant phase shift produced by an ideal transmitter displaying linear performance.
Figure 1E:
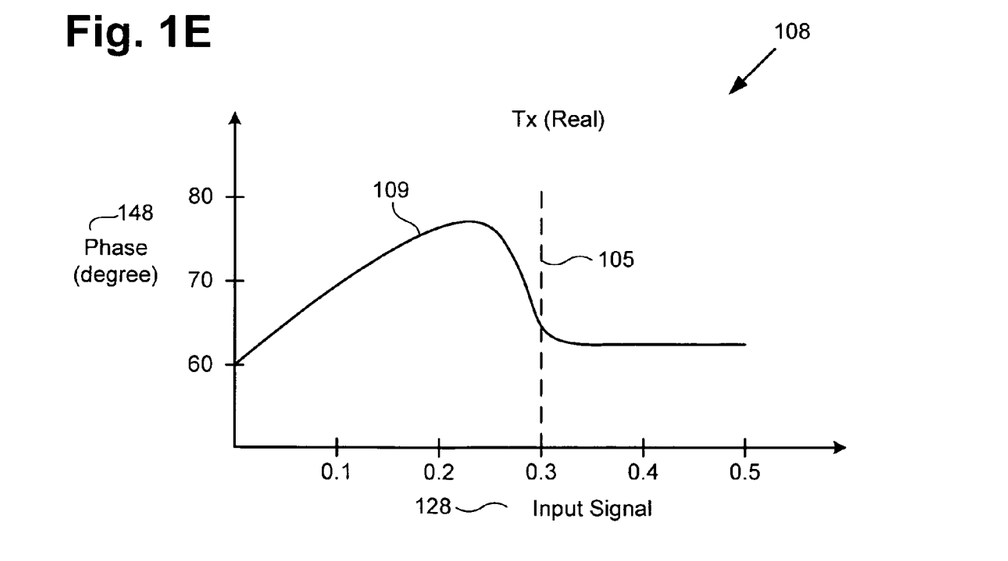
FIG. 1E is a graph showing an exemplary phase shift produced by a real transmitter displaying non-linear performance.

The performance of transmitter 140, in FIG. 1A, will be further described in conjunction with FIGS. 1B, 1C, 1D, and 1E, which illustrate deviations of an exemplary real transmitter from the performance profile of an ideal transmitter. FIG. 1B is a graph showing the amplitude of output signal 148 as a function of the amplitude of input signal 128 for an ideal transmitter displaying linear performance. By way of contrast, FIG. 1C is a graph showing the amplitude of output signal 148 as a function of the amplitude of input signal 128, for real transmitter 140 displaying non-linear performance. In addition, FIG. 1D is a graph showing a constant phase shift produced by an ideal transmitter, while FIG. 1E shows an exemplary phase shift produced by real non-linear transmitter 140.

Proceeding with FIGS. 1A and 1B, one aspect of the linear performance of an ideal transmitter is constant gain, which is present when the ratio of the amplitude of the output signal to the amplitude of the input signal is constant across the spectrum of possible input signal amplitudes to the transmitter. As may be seen from graph 101, in FIG. 1B, when the amplitude of output signal 148 is plotted on the vertical axis, as a function of the amplitude of input signal 128 plotted on the horizontal axis, gain is manifested as the slope of the resulting relational curve. For an ideal transmitter, that slope is constant, resulting in the relational curve taking the form of a line, as shown by constant gain line 102, in FIG. 1B.

Turning now to FIG. 1C, graph 103 shows the exemplary contrasting performance of real transmitter 140 in FIG. 1A. As in FIG. 1B, the amplitude of output signal 148 is plotted on the vertical axis, as a function of the amplitude of input signal 128 plotted on the horizontal axis. Unlike constant gain line 102, in FIG. 1B, gain curve 104 shown in FIG. 1C is linear, i.e. corresponds to constant gain, for only a limited range of input signal amplitudes. Beyond input threshold 105, which is shown to correspond to an input signal amplitude of 0.3 in FIG. 1C, the gain produced by transmitter 140 becomes variable, and effectively suppresses amplification by real transmitter 140 for those input signal values.

Another measure of the distortion produced by a real transmitter may be seen by comparison of FIGS. 1D and 1E. Graph 106, in FIG. 1D, shows the phase of output signal 148 (in degrees) as a function of the amplitude of input signal 128 for an ideal transmitter. As indicated by horizontal line 107, in the ideal case, output phase is constant for all input signal amplitudes. Graph 108, in FIG. 1E, shows a similar plotting of output phase as a function of input amplitude for real transmitter 140 in FIG. 1A. As shown by curve 109, for a real transmitter, such as transmitter 140, the output phase may vary in a complicated manner in response to various input amplitudes, and may introduce distortion effects.

A conventional approach to correcting for the distortion produced by real transmitter 140, in FIG. 1A, includes analytical modeling of the distortion effects shown in FIGS. 1C and 1E. In conventional methods for resolving transmitter distortion, the analytical modeling of the distortion effect may be used to develop an inverse distortion model. That inverse distortion model may be used in turn to provide a template for formulation of a pre-distortion algorithm designed to compensate for the anticipated distortion imposed by transmitter 140. As may be seen from simple inspection of the exemplary distortion profiles presented in FIGS. 1C and 1E, however, precise modeling of transmitter distortion can be a complex process that may be both time consuming and expensive to perform.

Figure 2:
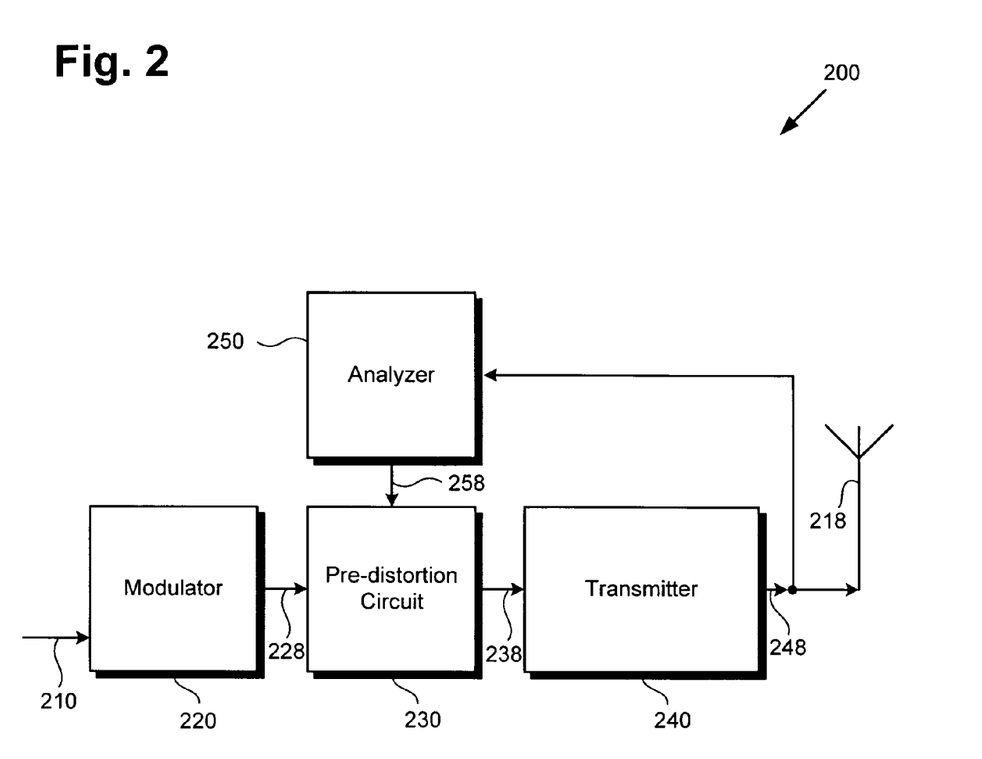
FIG. 2 is a block diagram of a system to prevent harmonics from causing distortion in a communications system, according to one embodiment of the present invention.

FIG. 2 is a block diagram of a system to prevent harmonics from causing distortion in a communications system, according to one embodiment of the present invention, capable of overcoming the disadvantages of conventional approaches described previously. FIG. 2 shows communications system 200, comprising modulator 220, pre-distortion circuit 230, transmitter 240, analyzer 250, and antenna 218. Also shown in FIG. 2 are command signal 210, test signal 228, signal 238, distorted output signal 248, and calibration signal 258.

Comparing communications system 200 to communications system 100, in FIG. 1A, modulator 220, test signal 228, transmitter 240, distorted output signal 248, and antenna 218, in FIG. 2, may be seen to correspond respectively to modulator 120, input signal 128, transmitter 140, output signal 148, and antenna 118, in FIG. 1A. Moreover, transmitter 240 may include components (not shown in FIG. 2A) corresponding to DAC 141, low-pass filter 142, mixer 144, PAD 146, and PA 147, in FIG. 1A. Communications system 200, in FIG. 2, may be utilized in a mobile telephone communicating at radio frequency (RF) in a range from approximately 1.8 GHz to approximately 2.1 GHz, or in a Bluetooth enabled device communicating at approximately 2.4 GHz, for example.

According to the embodiment of FIG. 2, analyzer 250 may be utilized to identify one or more undesired harmonics present in distorted output signal 248, and to calibrate pre-distortion circuit 230 to substantially eliminate those harmonics from communications system 200. The operation of analyzer 250 and pre-distortion circuit 230, in FIG. 2, as well as other elements comprised by communications system 200, will be described with reference to FIGS. 3A through 5B.

Figure 3A:
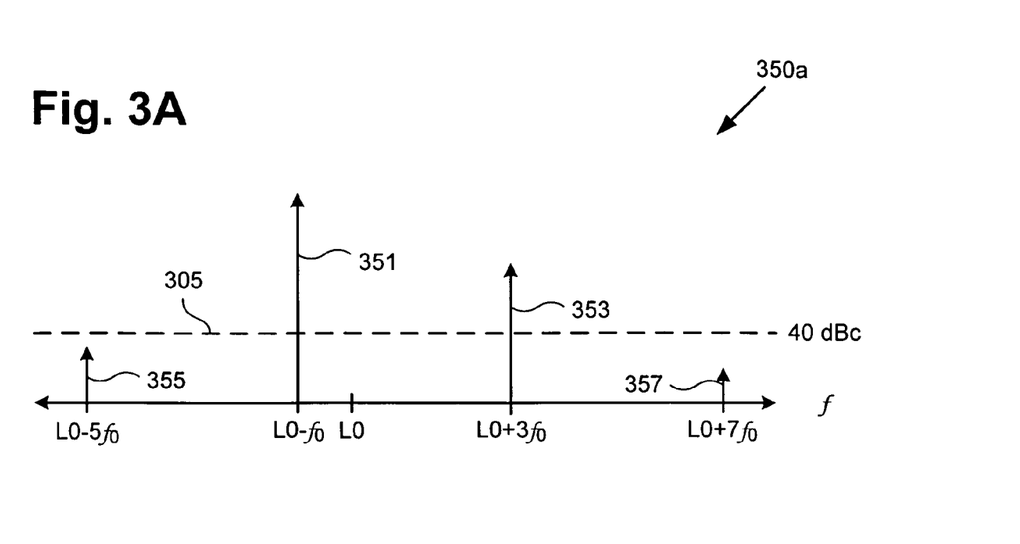
FIG. 3A is a graph showing an exemplary frequency spectrum of a distorted output signal including an undesired third harmonic.
Figure 3B:
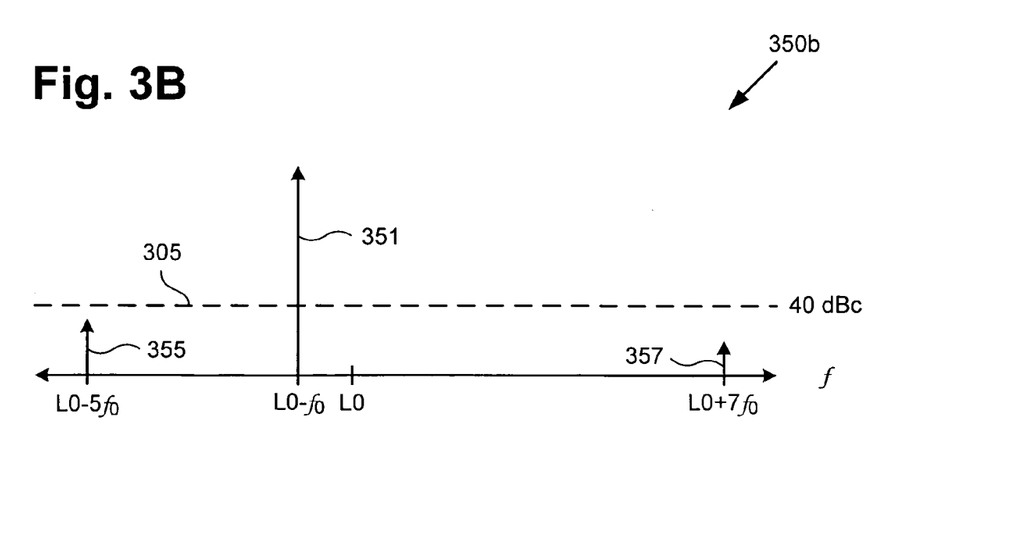
FIG. 3B is a graph showing the exemplary frequency spectrum of FIG. 3A with the undesired third harmonic substantially eliminated.
Figure 4A:
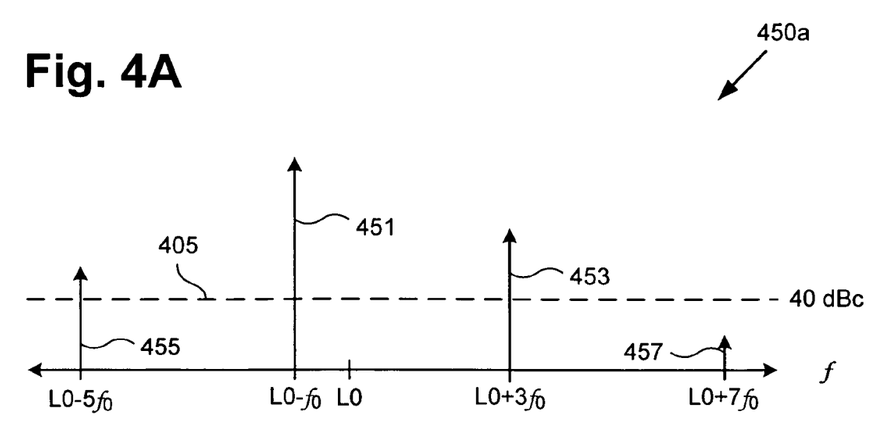
FIG. 4A is a graph showing an exemplary frequency spectrum of a distorted output signal including undesired respective third and fifth harmonics.
Figure 4B:
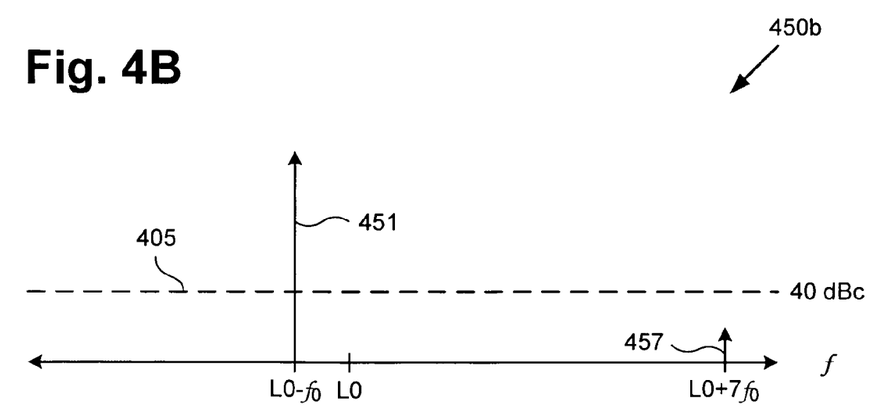
FIG. 4B is a graph showing the exemplary frequency spectrum of FIG. 4A with the undesired respective third and fifth harmonics substantially eliminated.
Figure 5A:
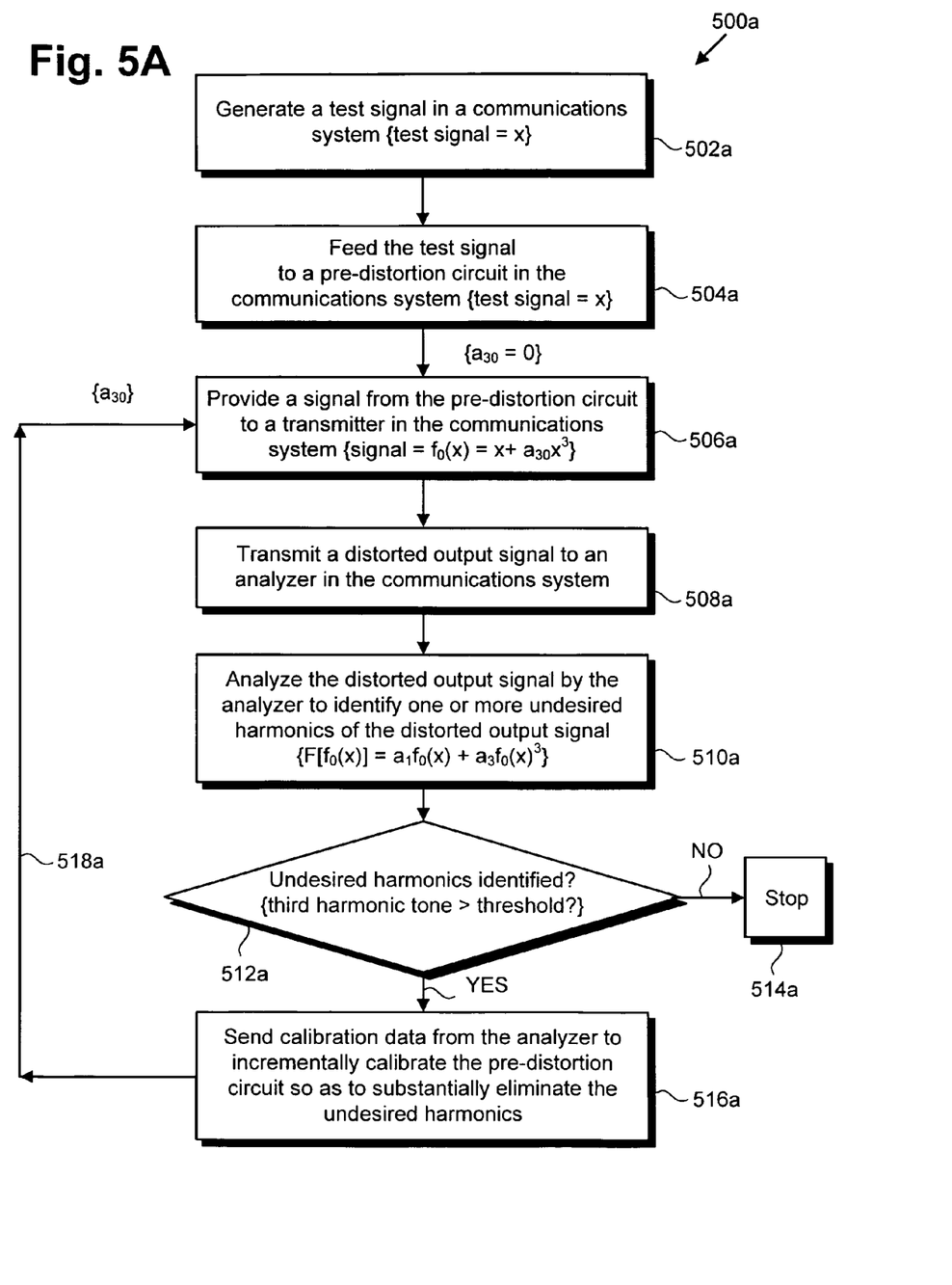
FIG. 5A shows a flowchart of a method of preventing harmonics from causing distortion in a communications system, according to one embodiment of the present invention.
Figure 5B:
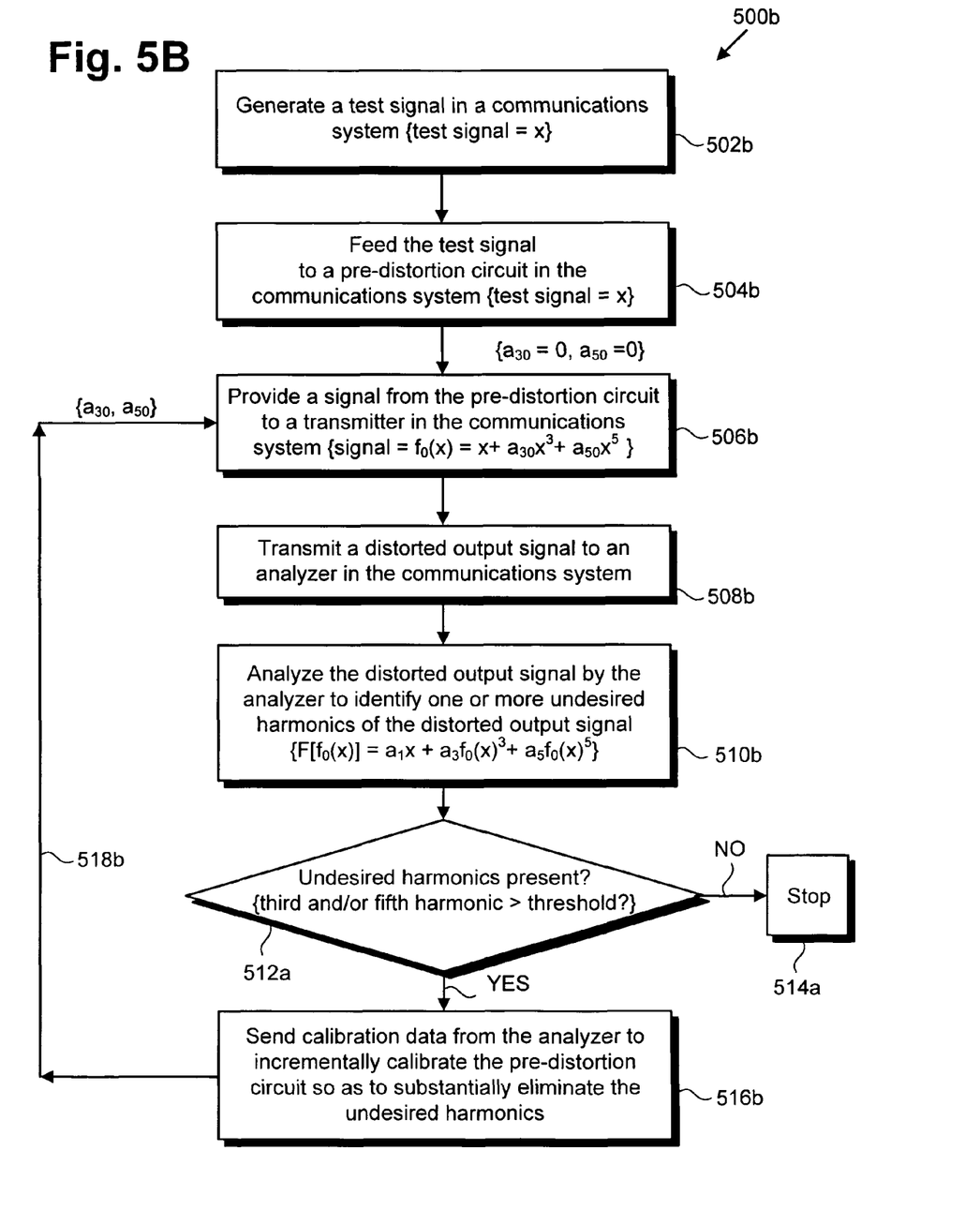
FIG. 5B shows a flowchart of a method of preventing harmonics from causing distortion in a communications system, according to another embodiment of the present invention.

FIGS. 3A and 3B each shows a graph of an exemplary frequency spectrum of distorted output signal 248, respectively before and after substantial elimination of an undesired third harmonic, while FIGS. 4A and 4B show graphs of exemplary frequency spectra of distorted output signal 248, respectively before and after substantial elimination of undesired third and fifth harmonics. FIG. 5A shows a flowchart of a method of preventing harmonics from causing distortion in a communications system, according to one embodiment of the present invention, and corresponds to FIGS. 3A and 3B. FIG. 5B shows a flowchart of a method of preventing harmonics from causing distortion in a communications system, according to another embodiment of the present invention, and corresponds to FIGS. 4A and 4B.

Turning to FIG. 5A, described in combination with FIGS. 2, 3A, and 3B, FIG. 5A shows flowchart 500a describing the steps, according to one embodiment of the present invention, of preventing harmonics from causing distortion in a communications system, for the exemplary case in which distortion is produced by an undesired third harmonic. Certain details and features have been left out of flowchart 500a that are apparent to a person of ordinary skill in the art. For example, a step may comprise one or more substeps or may involve specialized circuits, devices, or equipment, as known in the art. While steps 502a through 516a indicated in flowchart 500a are sufficient to describe one embodiment of the present invention, other embodiments of the invention may utilize steps different from those shown in flowchart 500a.

Referring to step 502a of flowchart 500a, with reference to FIG. 2, step 502a of flowchart 500a comprises generating a test signal in a communications system. Step 502a is shown in FIG. 2 by modulator 220 generating test signal 228. Test signal 228 may be generated in response to command signal 210, which may in turn be sent by other components of communication system 200, not shown in FIG. 2, for example. Alternatively, test signal 228 may be generated in response to command signal 220 provided by a software application under the control of an operating system for communications system 200, or by any suitable control mechanism complementary to the operation of communications system 200. For the purposes of the present application, test signal 228 corresponds to a signal of predetermined signal "x" in the time domain, and comprising an ideal single test frequency "$f_0$" in the frequency domain.

Continuing with step 504a of flowchart 500a and FIG. 2, step 504a comprises feeding test signal 228 to pre-distortion circuit 230 of communications system 200. As described with reference to step 502a, test signal 228 comprises a single test frequency and may be utilized to provide a baseline for later analysis of distorted output signal 248, for example.

In step 506a of flowchart 500a, signal 238 is provided from pre-distortion circuit 230 to transmitter 240. Pre-distortion circuit 230 operates to impose pre-distortion on test signal 228 to produce signal 238. Pre-distortion may be seen to correspond to a transformation defined by equation 1:

$$\text{signal } 238 = f_0(x) = x + a_{30}x^3 + a_{50}x^5 + \ldots a_{n0}x^n; \quad \text{(Equation 1)}$$

where x=test signal 228 and n=odd integer
The pre-distortion coefficients $a_{30}$ through $a_{n0}$ have initial zero values, so that during a first iteration of step 506a, Equation 1 reduces to Equation 2:

$$\text{signal } 238 = f_0(x) = x = \text{test signal } 228; \quad \text{(Equation 2)}$$

That is to say during an initial iteration of step 506a, pre-distortion circuit 230 does not operate to pre-distort test signal 228, but rather provides substantially undistorted test signal 228 as signal 238 to transmitter 240. It is noted, however, that during subsequent iterations of step 506a, shown by feedback loop 518a, in FIG. 5A, signal 238 may be provided as a pre-distorted signal from pre-distortion circuit 230.

Step 508a of flowchart 500a comprises transmitting distorted output signal 248, produced by transmitter 240, to analyzer 250. Proceeding to step 510a of flowchart 500a, step 510a comprises analyzing distorted output signal 248 in analyzer 250 to identify one or more undesired harmonics of distorted output signal 248. Referring to FIG. 3A in conjunction with step 510a of flowchart 500a and FIG. 2, FIG. 3A shows graph 350a of a frequency spectrum of distorted output signal 248 corresponding to the exemplary case in which distortion is produced by an undesired third harmonic. Graph 350a may be produced by performing a Fourier transform of distorted output signal 248 by analyzer 250, for example.

According to the exemplary distorted output frequency spectrum shown on graph 350a, desired transmission signal 351 appears at the local oscillator frequency (LO) minus the test signal frequency ($f_0$), i.e. at LO–$f_0$. It is noted that although in this example, desired transmission signal 351 is shown at LO–$f_0$, the present disclosure is equally applicable to both low-side injection mode and high-side injection mode communications. Also shown on graph 350a are third harmonic 353, fifth harmonic 355, and seventh harmonic 357, of distorted output signal 248, located respectively at frequencies LO+3 $f_0$, LO–5 $f_0$, and LO+7 $f_0$.

Graph 350a also shows distortion tolerance threshold 305, marking an exemplary tolerance level of 40 dBc (decibels relative to carrier). For the purposes of the present example, distortion effects measured below distortion tolerance threshold 305 may be deemed tolerable, while distortion effects caused by harmonics exceeding distortion tolerance threshold 305 identify those harmonics as undesired. It is further noted, however, that in other embodiments, distortion tolerance threshold 305 may vary from the present exemplary value of 40 dBc, and may assume any values appropriate to the specifications of those methods and systems.

As shown in FIG. 3A, graph 350a includes a single undesired harmonic at third harmonic 353. In many instances, a single undesired harmonic can be identified as the primary contributor to distortion produced by a transmitter in a communications system. Identification and substantial elimination of that harmonic provides a streamlined solution to the distortion problem that is simpler, less costly, and less time consuming to implement than conventional approaches. In the embodiment represented by FIG. 3A, for example, analysis of the frequency spectrum of distorted output signal 248 identifies third harmonic 353 as a primary contributor to distortion and thus an undesired harmonic.

Analysis of distorted output signal 248 by analyzer 250, in step 510a of the method of flowchart 500a may include characterization of one or more undesired harmonics through a power series expansion, for example. Continuing with the embodiment represented by graph 350a in FIG. 3A, analysis of distorted output signal 248 may proceed by forming an odd power series expansion of distorted output signal 248 expressed as a function of test signal 228, and solving for all distortion coefficients of order less than or equal to the highest order undesired harmonic. In the present embodiment, the only undesired harmonic is third harmonic 353, shown in FIG. 3A. Consequently, distorted output signal 248, which may be expressed as a function of test signal 228, i.e. F[$f_0$(x)] which reduces to F[x] during a first iteration of step 510a, may be characterized as a power series expansion by Equation 3a:

$$\text{distorted output signal } 248 = F[f_0(x)] = F[x] = a_1 x + a_3 x^3 \quad \text{(Equation 3a)};$$

More generally, a power series expansion of distorted signal 248 takes the form shown by Equation 4:

$$F[f_0(x)] = a_1[f_0(x)] + a_3[f_0(x)]^3 + a_5[f_0(x)]^5 + \ldots a_n[f_0(x)]^n, \quad \text{(Equation 4)}$$

n=odd integer corresponding to a highest order undesired harmonic where F[$f_0$(x)] is distorted output signal 248, $f_0$(x) is signal 238, and $a_n$ is the nth order distortion coefficient that can generate up to an nth order harmonic of distorted output signal 248. Thus, under the present exemplary conditions, Equation 2 may be substituted for Equation 1 in Equation 4 to yield Equation 3a, characterizing the distortion imposed by transmitter 240 on an input signal, such as signal 238. It is noted that although Equation 1 through Equation 4 are shown as power series summations, depending on the particular circumstances, the respective pre-distortion coefficients $a_{n0}$ and the distortion coefficients $a_n$ may assume positive and negative values.

In step 512a of flowchart 500a, the analysis performed in step 510a is utilized as a decision criterion as to whether substantial distortion is present in distorted output signal 248. Turning to FIG. 3A, in a situation in which all harmonics appear below distortion tolerance threshold 305, i.e. each of third harmonic 353, fifth harmonic 355, and seventh harmonic 357 are less than 40 dBc, for example, distorted output signal 248 may be deemed free of substantial distortion, and the method of flowchart 500a may stop at step 514a. Where, however, as in FIG. 3A, third harmonic 353 exceeds distortion tolerance threshold 305, calibration data 258 is sent from analyzer 250 to pre-distortion circuit 230, in FIG. 2, at step 516a in FIG. 5A. Calibration data, which in the present embodiment corresponds to pre-distortion coefficient $a_{30}$, as shown by feedback loop 518a, in FIG. 5A, may be used to incrementally calibrate pre-distortion circuit 230, to substantially eliminate undesired third harmonic 353. This is shown in FIG. 3B by the absence of undesired third harmonic 353 in the frequency spectrum of graph 350b. The present embodiment thereby prevents undesired third harmonic 353 from causing distortion in communications system 200.

Steps 502a through 516a may undergo one or more iterations, until decision step 512a determines that distorted output signal 248 is substantially free of distortion. During each iteration calibration data 258 from analyzer 250 is utilized to calibrate pre-distortion circuit 230. In the simplified case set forth in the present embodiment, in which substantial distortion is initially present as a result of the third harmonic only, pre-distortion coefficient $a_{30}$ corresponding to calibration data 258 may be determined according to first and third order distortion coefficients $a_1$ and $a_3$. For example, turning once again to Equation 1 for a second or later iteration of steps 502a through 516a of present embodiment:

$$\text{signal } 238 = f_0(x) = x + a_{30}x^3.$$

Substitution of Equation 1 into Equation 3a converges to a solution for $a_{30} = -a_3/a_1$. In some instances, $a_1$ may be substantially equal to unity, so that analysis of distorted output signal 248 reduces to identification of third order distortion coefficient $a_3$.

Turning now to FIG. 5B, described in combination with FIGS. 2, 4A, and 4B, FIG. 5B shows flowchart 500b describing the steps, according to another embodiment of the present invention, of preventing harmonics from causing distortion in a communications system for the exemplary case in which distortion is produced by undesired respective third and fifth harmonics. As was the case for flowchart 500a in FIG. 5A, certain details and features have been left out of flowchart 500b that are apparent to a person of ordinary skill in the art. For example, a step may comprise one or more substeps or may involve specialized circuits, devices, or equipment, as known in the art. While steps 502b through 516b indicated in flowchart 500b are sufficient to describe one embodiment of the present invention, other embodiments of the invention may utilize steps different from those shown in flowchart 500b.

Steps 502b through 516b and feedback loop 518b, correspond respectively to steps 502a through 516a and feedback loop 518a, in FIG. 5A, but in the present instance for the case in which substantial distortion is produced either by undesired respective third and fifth harmonics of distorted output signal 248, or by an undesired fifth harmonic alone. As was true for the method shown in FIG. 5A, flowchart 500b proceeds through steps 502b to 508b by, respectively, generating test signal 228 ("x") in communication system 200, feeding test signal 228 to pre-distortion circuit 230, providing signal 238 from pre-distortion circuit 230 to transmitter 240, and transmitting distorted output signal 248 to analyzer 250. As before, during a first iteration, the respective pre-distortion coefficients $a_{n0}$ of Equation 1 have zero value, so that Equation 2 applies to render signal 238 substantially equal to test signal 228 for a first iteration.

Referring now to FIG. 4A in conjunction with step 510b of flowchart 500b and FIG. 2, FIG. 4A shows graph 450a of a frequency spectrum of distorted output signal 248 corresponding to the exemplary case in which distortion is produced by respective undesired third and fifth harmonics. According to the exemplary distorted output frequency spectrum shown on graph 450a, desired transmission signal 451 appears as before at LO–$f_0$. It is noted anew that although in this example, desired transmission signal 451 is shown at LO–$f_0$, the present disclosure is equally applicable to both low-side injection mode and high-side injection mode communications. Also shown on graph 450a are third harmonic 453, fifth harmonic 455, and seventh harmonic 457, of distorted output signal 248, located respectively at frequencies LO+3 $f_0$, LO–5 $f_0$, and LO+7 $f_0$. Graph 450a also shows distortion tolerance threshold 405, marking an exemplary tolerance level of 40 dBc. As before, only distortion effects caused by harmonics exceeding distortion tolerance threshold 405 result in those harmonics being undesired.

As shown in FIG. 4A, graph 450a includes undesired harmonics at third harmonic 453 and fifth harmonic 455. As described previously, analysis of distorted output signal 248 by analyzer 250, in step 510b of the method of flowchart 500b may include characterization of the undesired harmonics through a power series expansion. Continuing with the embodiment represented by graph 450a in FIG. 4A, analysis of distorted output signal 248 may proceed by forming an odd power series expansion of distorted output signal 248 expressed as a function of signal test 228, and solving for all distortion coefficients of order less than or equal to the highest order undesired harmonic. In the present embodiment, the highest order undesired harmonic is fifth harmonic 455, shown in FIG. 4A. Consequently, distorted output signal 248, which may be expressed as a function of test signal 228, i.e. $F[f_0(x)]$ which reduces to $F[x]$ during a first iteration of step 510a, may be characterized as a power series expansion by Equation 3b:

$$\text{distorted output signal } 248 = F[f_0(x)] = F[x] = a_1x + a_3x^3 + a_5x^5 \quad \text{(Equation 3b)}$$

In step 512b of flowchart 500b, the analysis performed in step 510b is utilized as a decision criterion as to whether substantial distortion is present in distorted output signal 248. Turning to FIG. 4A, in a situation in which all harmonics appear below distortion tolerance threshold 405, i.e. each of third harmonic 453, fifth harmonic 455, and seventh harmonic 457 are less than 40 dBc, for example, distorted output signal 248 may be deemed free of substantial distortion, and the method of flowchart 500b may stop at step 514b. Where, however, as in FIG. 4A, third harmonic 453 and fifth harmonic 455 exceed distortion tolerance threshold 405, or, alternatively only fifth harmonic 455 exceeds distortion tolerance threshold 405, calibration data 258 is sent from analyzer 250 to pre-distortion circuit 230, at step 516b of flowchart 500b. Calibration data, which in the present embodiment correspond to pre-distortion coefficients $a_{30}$ and $a_{50}$ shown by feedback loop 518b, may be used to incrementally calibrate pre-distortion circuit 230, to substantially eliminate undesired respective third and fifth harmonics 453 and 455. This is shown in FIG. 4B by the absence of undesired third and fifth harmonics 453 and 455 from the frequency spectrum of graph 450b. The present embodiment thereby prevents respective undesired third harmonic 453 and undesired fifth harmonic 455 from causing distortion in communications system 200.

Similar to the method of flowchart 500a, in flowchart 500b steps 502b through 516b may undergo one or more iterations, until decision step 512b determines that distorted output signal 248 is substantially free of distortion. During each iteration, calibration data 258 from analyzer 250 is utilized to calibrate pre-distortion circuit 230. In the case set forth in the present embodiment in which substantial distortion is initially present as a result of the third and fifth harmonics only, pre-distortion coefficients $a_{30}$ and $a_{50}$ corresponding to calibration data 258 may be determined according to first, third, and fifth order distortion coefficients $a_1$, $a_3$, and $a_5$. Returning to Equation 1 for a second or later iteration of steps 502b through 516b:

$$\text{signal } 238 = f_0(x) = x + a_{30}x^3 + a_{50}x^5$$

Substitution of Equation 1 into Equation 3b gives:

$$F[f_0(x)] = a_1(x + a_{30}x^3 + a_{50}x^5) + a_3(x + a_{30}x^3 + a_{50}x^5)^3 + a_5(x + a_{30}x^3 + a_{50}x^5)^5$$

which converges to a substantially undistorted solution for calibration data corresponding to pre-distortion coefficients $a_{30}$ and $a_{50}$ expressed as functions of distortion coefficients $a_1$, $a_3$, and $a_5$.

In its various embodiments, the present invention's method and system to prevent harmonics from causing distortion in a communications system can be utilized in, for example, a wireless communications device, a mobile telephone, a Bluetooth enabled device, a computer, a satellite set-top box, an RF transceiver, a personal digital assistant (PDA), or in any other kind of device, component or module utilized for communication in modern electronics applications.

By analyzing a distorted output signal produced from a test signal to identify one or more undesired harmonics contributing to distortion, the present invention discloses a method and system that streamlines and simplifies modeling of distortion in a communications system. By calibrating a pre-distortion circuit to substantially eliminate the undesired harmonics in a selective manner, the present invention discloses an approach that avoids the analytical rigors and reduces the time required to implement an effective pre-distortion circuit in conventional methods. As a result, the present invention discloses an efficient and comparatively inexpensive solution providing substantial correction for the distortion of an output signal produced by a transmitter utilized in a communications system.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, a method and system to prevent harmonics from causing distortion in a communications system have been described.

The invention claimed is:

1. A method of preventing harmonics from causing distortion in a communications system, said method comprising:
   feeding a test signal through a pre-distortion circuit in said communications system to an input of a transmitter in said communications system, wherein said pre-distortion circuit provides said test signal to said transmitter substantially without pre-distortion during an initial iteration to provide a baseline for an analyzer;
   transmitting a distorted output signal produced by said transmitter to said analyzer;
   analyzing said distorted output signal in said analyzer to identify one or more undesired harmonics of said distorted output signal;
   generating and sending a calibration data from said analyzer to calibrate said pre-distortion circuit, thereby preventing said one or more undesired harmonics from causing distortion in said communications system.

2. The method of claim 1, wherein said one or more undesired harmonics comprise a third harmonic of said distorted output signal.

3. The method of claim 1, wherein said analyzing comprises determining a third order term coefficient in a power series expansion of a pre-distorted signal.

4. The method of claim 1, wherein said calibration data is determined by respective first and third order term coefficients in a power series expansion of said distorted output signal.

5. The method of claim 1, wherein said one or more undesired harmonics comprise a fifth harmonic of said distorted output signal.

6. The method of claim 1, wherein said analyzing comprises determining respective third and fifth order term coefficients in a power series expansion of a pre-distorted signal.

7. The method of claim 1, wherein said calibration data is determined by respective first, third, and fifth order term coefficients in a power series expansion of said distorted output signal.

8. The method of claim 1, wherein said communications system comprises a transceiver.

9. The method of claim 1, wherein said transmitter is configured to transmit at radio frequency (RF).

10. The method of claim 1, wherein said communications system is selected from the group consisting of a wireless communications device, a mobile telephone, a Bluetooth enabled device, a computer, a satellite set top box, and a personal digital assistant (PDA).

11. A system to prevent harmonics from causing distortion in a communications system, said system comprising:
   a pre-distortion circuit configured to receive a test signal from a modulator in said system, wherein said pre-distortion circuit provides said test signal to said transmitter substantially without pre-distortion during an initial iteration to provide a baseline for an analyzer;
   a transmitter configured to receive a signal provided by said pre-distortion circuit at an input of said transmitter;
   said analyzer for receiving a distorted output signal produced by said transmitter, said analyzer configured to identify one or more undesired harmonics of said distorted output signal, and further configured to generate and send a calibration data to calibrate said pre-distortion circuit, thereby preventing said one or more undesired harmonics from causing distortion in said communications system.

12. The system of claim 11, wherein said one or more undesired harmonics comprise a third harmonic of said distorted output signal.

13. The system of claim 11, wherein said analyzer is configured to determine a third order term coefficient in a power series expansion of a pre-distorted signal.

14. The system of claim 11, wherein said calibration data is determined by respective first and third order terms coefficient in a power series expansion of said distorted output signal.

15. The system of claim 11, wherein said one or more undesired harmonics comprise a fifth harmonic of said distorted output signal.

16. The system of claim 11, wherein said analyzer is configured to determine respective third and fifth order term coefficients in a power series expansion of a pre-distorted signal.

17. The system of claim 11, wherein said calibration data is determined by respective first, third, and fifth order term coefficients in a power series expansion of said distorted output signal.

18. The system of claim 11, wherein said communications system comprises a transceiver.

19. The system of claim 11, wherein said transmitter is configured to transmit at radio frequency (RF).

20. The system of claim 11, wherein said communications system is selected from the group consisting of a wireless communications device, a mobile telephone, a Bluetooth enabled device, a computer, a satellite set top box, and a personal digital assistant (PDA).

* * * * *